United States Patent [19]
Lee

[11] Patent Number: 5,410,372
[45] Date of Patent: Apr. 25, 1995

[54] ADVANCED VDT SCREEN SHIELDING METHOD AND APPARATUS

[76] Inventor: Chin-Hung Lee, No. 70-2, Chung Chuang Tzu, Chia Chung, Hsia Ying Hsiang, Tainan, Taiwan, Prov. of China

[21] Appl. No.: 943,627

[22] Filed: Sep. 11, 1992

[51] Int. Cl.$^6$ .................. G02B 27/00; H04N 5/65
[52] U.S. Cl. .................. 348/818; 348/819; 348/834; 313/479
[58] Field of Search ............ 348/818, 819, 820, 832, 348/833, 834, 835, 842; 313/477 R, 478, 479

[56] References Cited

U.S. PATENT DOCUMENTS

| | | |
|---|---|---|
| 4,253,737 | 3/1981 | Thomsen et al. |
| 4,468,702 | 8/1984 | Jandrell |
| 4,760,456 | 7/1988 | Liang |
| 4,788,597 | 11/1988 | Gart et al. |
| 4,974,935 | 12/1990 | Lee |
| 5,132,588 | 7/1992 | Warman |

Primary Examiner—Bentsu Ro
Attorney, Agent, or Firm—Browdy and Neimark

[57] ABSTRACT

An advanced video display terminal (VDT) screen shielding method and apparatus includes an electric resistance lower than or equal to $10^5\Omega (R \leq 10^5\Omega)$, a transmittance between $\frac{1}{3}$ to $\frac{2}{3}$, a fiber diameter $D \leq MIN(D_1, D_2)$. Wherein $D_1 = VD \times 25.4 \times 0.8/RV \times 0.16$ or $D_1 = VD \times 25.4 \times 0.6/RH \times 0.16$, $D_2 = VD \times PA^3 - QA^2 + RA - S$, $P = 1.342 \pm 0.002$, $Q = 2.032 \pm 0.002$, $R = 1.011 \pm 0.002$, $S = 0.116 \pm 0.002$ and the aperture is a circle, ellipse, polygon, square or other transfigure. A formed angle $\leq 45°$ of the fabric is horizontally against cathode ray tube. This screen-shielding method could suitably reduce glare and reflected lights, eliminate electrostatic charges and low frequency radiation, and prevent Moires and/or Newton Rings. This screen-shielding apparatus includes a frame, the high conductive fabric and a suitable ground wire, and is installed in front of the surface of the CRT.

2 Claims, 2 Drawing Sheets

ADVANCED VDT SCREEN SHIELDING METHOD AND APPARATUS

FIELD OF THE INVENTION

The present invention relates to an advanced shielding method and apparatus for use in reducing glare and reflected light, eliminating electrostatic charges and low frequency radiation, and preventing Moires and/or Newton Rings from occurring.

BACKGROUND OF THE INVENTION

Use of video display terminals (VDT) in data processing equipment, office automation equipment, video games and TV is increasing rapidly. But as know, the glare and reflected light generated from the surface of a cathode ray tube (CRT) can cause eye fatigue, added eye pressure, headache, etc. Emission of low frequency radiation and electrostatic charges from a VDT can be even more harmful. At the 1986 and 1989 International Scientific Conference, aimed at Work With Display Units (WWDU), a number of such cases were reported by scientists and doctors. In their reports, it was noted that electrostatic charges can attract bacteria or pollutants with an opposite charge to the screen. Thereafter, other bacteria or pollutants having the same charge can bombard the operator when replaced by the bacteria on the screen.

In addition, a controversy over non-ionization radiation has continued on for years. Though electromagnetic radiation generated from screen is well below an injury-causing level, such low frequency radiation does exist. Some old-fashioned or inferior VDTs emit radiation over the limit permitted by government regulations and guidelines. A prior art anti-static CRT has been developed to overcome this problem. The prior art method of coating the CRT surface with a thin, transparent conductive layer leaves a high electric resistance impending conduction. Moreover, the thin transparent layer, results in reflection and diffusion of light.

VDTs are available with many different characteristics. For instance, they can vary in viewing diagonal from 5" to 40"; in screen surface they can vary from cylinderical, spherical to flat surfaces; in color from mono-chrome, 2-color, 4-color, 16-color, even to 160-million color; in resolution from 160X200, 320X200, 640X200, 640X480, to 4096X4096. In fact, in any type of CRT whether monochromatic or color, a few naturally defective points like missing phosphor dots (M.P.D.), blemishes and small scratches are admitted. In color CRT especially, a heat-causing expansion of aperture of the shadow mask thereof, which is generally iron material or iron-nickel alloy, may sometimes lead to the phenomenon of distorted images, Moires and/or Newton Rings. In prior art U.S. Pat. Nos. 4,253,737; 4,468,702; 4,760,456; 4,788,597; 4,974,935, solution of such problems are not presented.

The device of patent '737 is directed to overcoming glare and reflected light. However, because pollutants can easily be attracted to and stick to the mesh, the viewing is obstructed and Moires and/or Newton Rings occur. The device of patent '702 uses nylon yarns with a conductive thread-woven central area. This weaving is very complicated, but does not produce any better result than the present invention. The device of patent '597 includes a conductive mesh, a moveable frame in size adapted to CRT front frame (bezel) and a ground wire. The bezel construction result is very complicated resulting in a significant increase in cost.

The device of patent '935 includes a conductive mesh, a rigid frame and a ground wire, and is characterized by a fiber diameter between 20–100 $\mu$m, an aperture between 45–230 $\mu$m and formed angle with frame between 10°–45°. In experiments it was found to be unable to fit any kind of VDT.

OBJECTS OF THE INVENTION

In view of above-mentioned problems, the present invention is directed to new VDT screen shielding method and apparatus whose features include:
1. A black conductive fabric to fit the viewing of CRT's, to reduce glare and reflected light.
2. Means to increase the contrast of VDT to lower the burden on the eye.
3. The high conductive fabric further absorbs electrostatic charges and ion frequency radiation and a ground wire eliminates such charges and radiation.
4. The black conductive fabric further eliminates Moires and/or Newton Rings which may disturb viewing conditions.
5. The prevention of distorted images and abnormal colors produced by magnetism.

SUMMARY OF THE INVENTION

A new VDT screen shielding apparatus that includes a frame, a high conduct fabric and a ground wire is in a suitable way positioned in front of the surface of a CRT. Wherein characteristics of the high conductive fabric are listed as below:

(A) Resistance: $R \leq 10^5 \, \Omega$:
(B) Transmittance: $\frac{1}{3} \leq T \leq \frac{2}{3}$:
(C) Fiber diameter: $D \leq MIN(D_1, D_2)$:

Wherein
$D_1 = VD \times 25.4 \times 0.8 / RV \times 0.16$ or
$D_1 = VD \times 25.4 \times 0.6 / RH \times 0.16$
$D_2 = PA^3 QA^2 + RA - S$
$P = 1.342 \pm 0.002$
$Q = 2.032 \pm 0.002$
$R = 1.011 \pm 0.002$
$S = 0.116 \pm 0.002$ Wherein
VD stands for viewing diagonal;
RH stands for numbers of horizontal scanning lines;
RV stands for numbers of vertical scanning lines;
A stands for dot pitchs; and
(D) is types aperture: circle, ellipse, polygon, square or other transfigure, and
(E) is formed angle of the fabric horizontally against the CRT: $\theta \leq 45°$.

DETAILED DESCRIPTION OF THE PREFERRED EMBODIMENT(S) OF THE INVENTION

Figure 1:
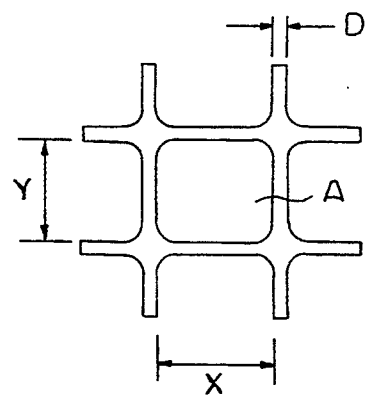
FIG. 1 shows the transmittance of the invention.
Figure 3A:
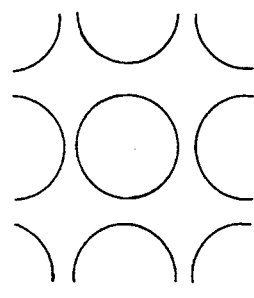
FIG. 3 shows the types of the aperture of the invention.
Figure 3B:
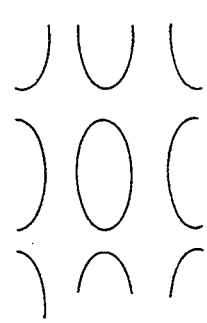
Figure 3C:
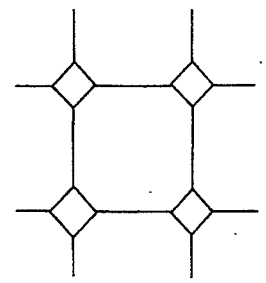
Figure 3E:
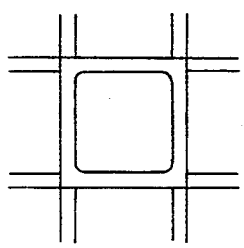
Figure 3F:
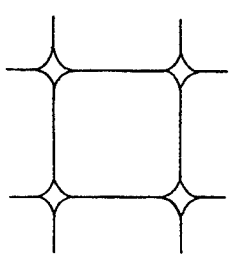
Figure 3D:
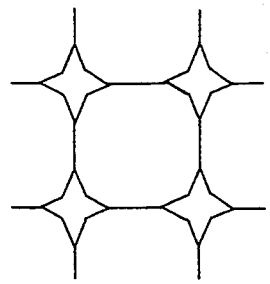

VDTs generally have a displaying speed of over 30 frames per sec, and those of high resolution a speed of 70 frames per sec. The amount of emitted electrostatic charges and low frequency radiation goes up with the faster displaying speed and more colors. A better conductive mesh for better absorption and conduction effects is very much needed. After conducting a series of experiments, it was determined that the best results were achieved at an electric resistance lower than or equal to $10^5 \Omega$. Transmittance, T in FIG. 1, within the range of $\frac{1}{3}$ to $\frac{2}{3}$ results in the best human viewing of a CRT. As FIG. 1 shows, T is represented by the formula T=A/XY. Wherein, A stands for the aperture area, X and Y respectively stand for the length and width of the aperture with the fiber diameter included. A combination of strong lights and reflected lights is received by the user from the screen. If transmittance is within the $\frac{1}{3}$ to $\frac{2}{3}$ range, the VDT offers a viewing sense continuation twice as long as the other VDT not using this invention.

Figure 2:
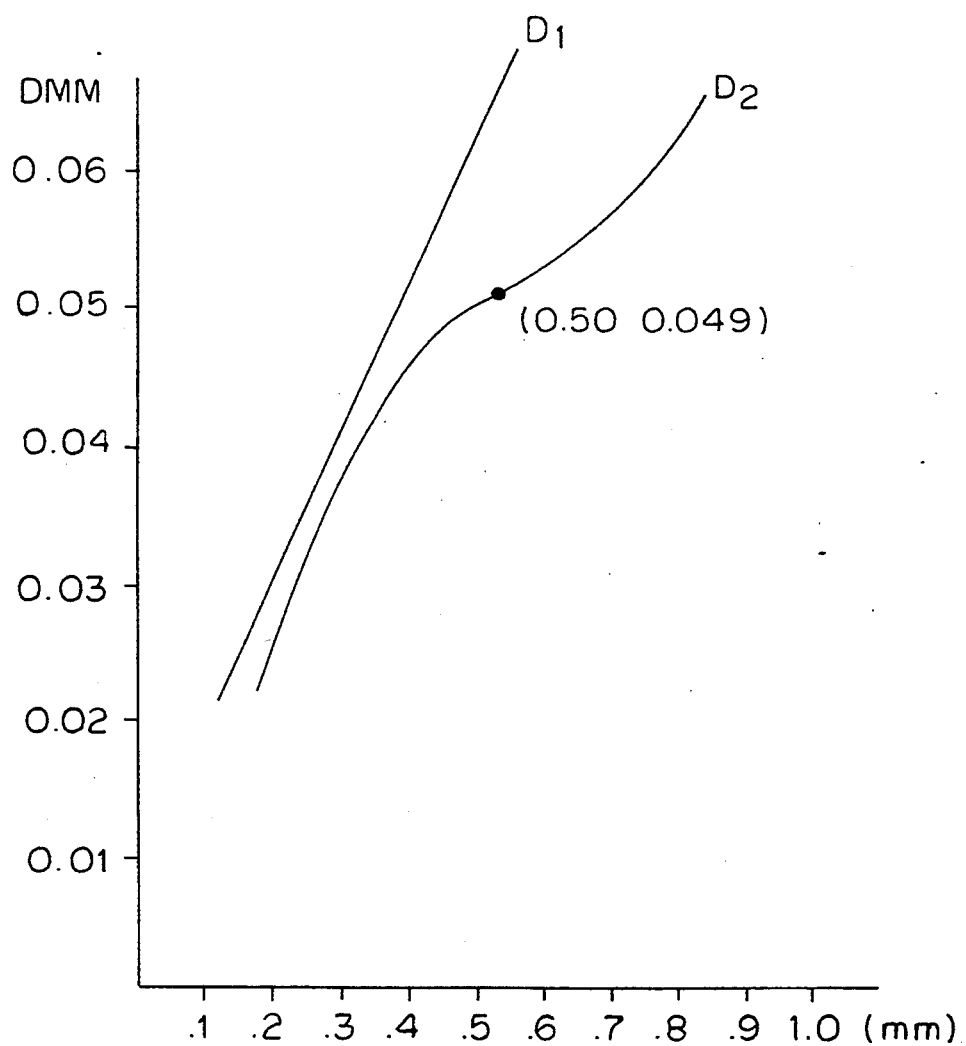
FIG. 2 shows the relationship among fiber diameter, resolution and dot pitch of the invention.

With regard to Moires and/or Newton Rings, which occur in color VDT, especially those having more colors and higher resolution, there is no indication of how they might be controlled in the prior art. The relationship among CRT, fiber diameter and aperture embodies a primary feature of the invention as shown in FIGS. 2 and 3. An analysis table of a 14" general-type VDT using this invention is as follows:

| resolution | D | aperture type | Transmittance T | 0° | 15° | 30° | 45° |
|---|---|---|---|---|---|---|---|
| COLOR | | | | | | | |
| 320 × 240 | 55 ± 1 μm | A | T1 | N | N | N | N |
| | | | T2 | N | N | N | N |
| | | B | T1 | Y | N | N | N |
| | | | T2 | Y | N | N | N |
| 640 × 480 | 49 ± 1 μm | A | T1 | N | N | N | N |
| | | | T2 | N | N | N | N |
| | | B | T1 | Y | N | N | N |
| | | | T2 | Y | N | N | N |
| 800 × 600 | 42 ± 1 μm | A | T1 | N | N | N | N |
| | | | T2 | N | N | N | N |
| | | B | T1 | Y | N | N | N |
| | | | T2 | Y | N | N | N |
| 1024 × 768 | 33 ± 1 μm | A | T1 | N | N | N | N |
| | | | T2 | N | N | N | N |
| | | B | T1 | Y | N | N | N |
| | | | T2 | Y | N | N | N |
| MONO | | | | | | | |
| 320 × 240 | 55 ± 1 μm | A/B | T1/T2 | N | N | N | N |
| 640 × 480 | 49 ± 1 μm | A/B | T1/T2 | N | N | N | N |
| 800 × 600 | 42 ± 1 μm | A/B | T1/T2 | N | N | N | N |
| 1024 × 768 | 33 ± 1 μm | A/B | T1/T2 | N | N | N | N |

Wherein
1. A could be circle, polygon, ellipse or other transfigure.
2. B is a square.
3. T1=35%.
4. T2=65%.
5. Y indicates the Moires and/or Newton Rings found.
6. N indicates that no Moires and/or Newton Rings were found.

As proved, this new VDT screen shielding method and apparatus results in increased comfort and protection when viewing a VDT.

I claim:

1. An advanced video display terminal (VDT) screen shielding apparatus comprising a frame, a high conductive fabric and a suitable ground wire for installation in front of a cathode ray tube (CRT) surface; said high conductive fabric having:
   a resistance of $R \leq 10^5 \Omega$;
   a transmittance of $\frac{1}{3} \leq T \leq \frac{2}{3}$;
   a fiber diameter of $D \leq MIN(D_1, D_2)$;
   wherein
   $D_1 = VD \times 25.4 \times 0.8 / RV \times 0.16$ or
   $D_1 = VD \times 25.4 \times 0.6 / RH \times 0.16$
   $D_2 = PA^3 - QA^2 + RA - s$
   $P = 1.342 \pm 0.002$
   $Q = 2.032 \pm 0.002$
   $R = 1.011 \pm 0.002$
   $S = 0.116 \pm 0.002$
   wherein
   VD stands for viewing diagonal;
   RH stands for numbers of horizontal scanning lines;
   RV stands for numbers of vertical scanning lines;
   A stands for dot pitch; and
   wherein an aperture of the high conductive fabric is a circle, ellipse, polygon, or square; and
   a formed angle of the fabric horizontally against CRT is $\Theta \leq 45°$.

2. An advanced video display terminal screen shielding apparatus according to claim 1, wherein said high conductive fabric is engaged to a cathode ray tube surface with connection led to ground.

\* \* \* \* \*